United States Patent Office 3,712,892
Patented Jan. 23, 1973

3,712,892
QUINAZOLINONE DERIVATIVES
Shigeho Inaba, Takarazuka, Michihiro Yamamoto, Toyonaka, Kikuo Ishizumi, Minoo, Kazuo Mori, Kobe, and Hisao Yamamoto, Nishinomiya, Japan, assignors to Sumitomo Chemical Company, Ltd., Osaka, Japan
No Drawing. Filed July 29, 1970, Ser. No. 59,337
Claims priority, application Japan, Aug. 2, 1969, 44/61,222; Aug. 4, 1969, 44/61,872; Sept. 4, 1969, 44/70,453; Dec. 8, 1969, 44/98,836; Dec. 9, 1969, 44/99,196; Dec. 19, 1969, 44/102,810; Jan. 23, 1970, 45/6,531; Jan. 24, 1970, 45/6,628; Feb. 17, 1970, 45/14,069
Int. Cl. C07d 51/48
U.S. Cl. 260—251 QB     19 Claims

ABSTRACT OF THE DISCLOSURE

Novel quinazoline derivatives, which are useful as medicines, of the formula,

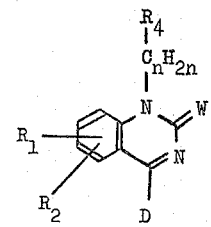

wherein D is a group of the formula

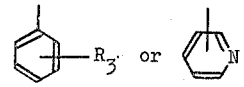

$n$ is 0 or an integer of 1 to 3; $R_1$, $R_2$ and $R_3$ each is hydrogen, halogen, $C_{1-4}$ alkyl, $C_{1-4}$ alkoxy, nitro, trifluoromethyl, etc.; $R_4$ is $C_{3-6}$ cycloalkyl; and W is oxygen or sulfur. These quinazoline derivatives are produced by any of reactions as shown in the following reaction schema;

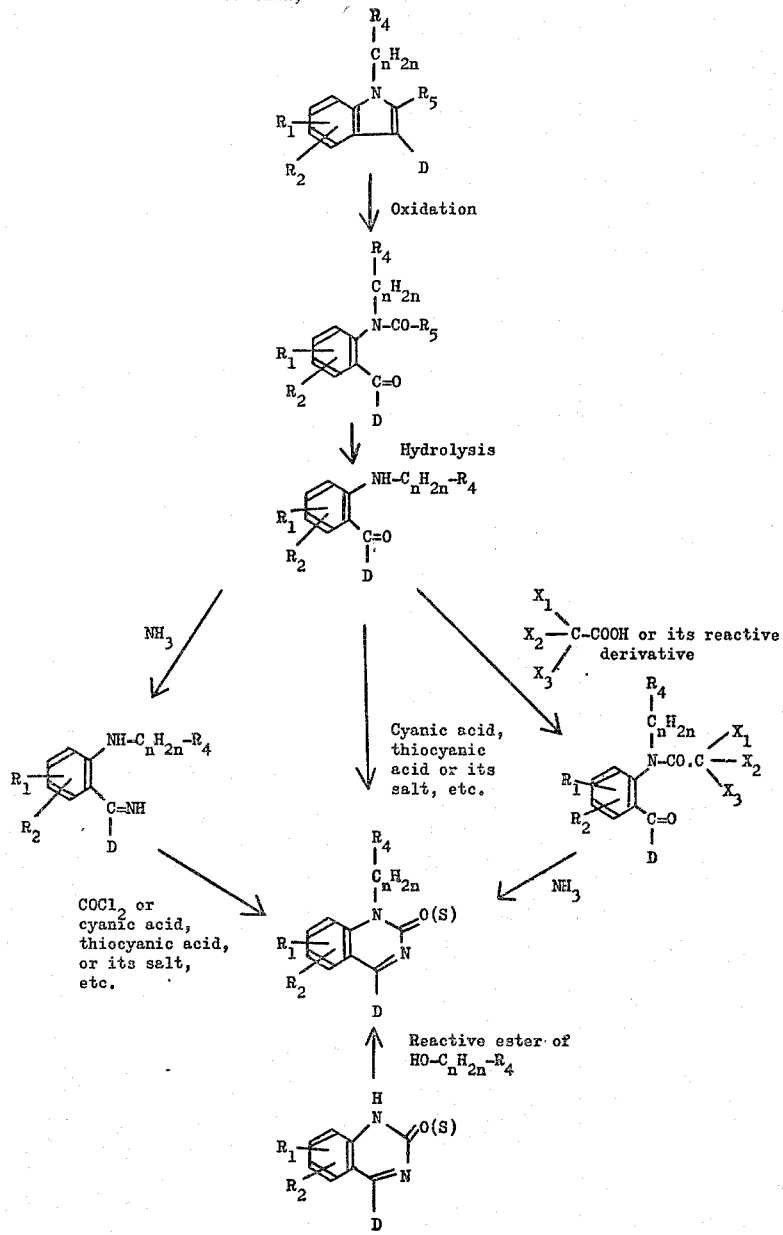

wherein D, $n$, $R_1$, $R_2$, $R_4$ and W are the same as defined above, and $R_5$ is $C_{1-4}$ alkoxy-carbonyl, carboxy, carbamoyl or cyano.

This invention relates to novel quinazoline derivatives and process for the production thereof.

More particularly, this invention pertains to novel quinazoline derivatives of the formula,

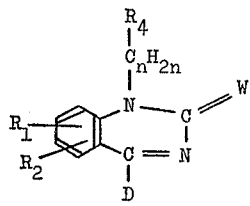

wherein D represents a group of the formula,

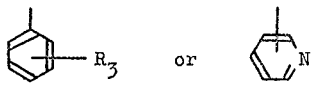

$n$ represents 0 or an integer of 1, 2 or 3; $R_1$, $R_2$ and $R_3$ each represents hydrogen, halogen, nitro, $C_{1-4}$ alkyl, $C_{1-4}$ alkoxy, $C_{1-4}$ alkylthio, $C_{1-4}$ alkylsulfonyl, $C_{1-4}$ alkylsulfinyl or trifluoro-methyl; $R_4$ represents $C_{3-6}$ cycloalkyl; and W represents oxygen or sulfur; and method for the production and pharmaceutical use of the same.

In the compounds represented by the aforesaid Formula I, examples of the halogen atom include chlorine, bromine, iodine and fluorine atoms; examples of $C_{1-4}$ alkyl group include methyl, ethyl, n-propyl, isopropyl, n-butyl, isobutyl and tertiary butyl groups, examples of $C_{1-4}$ alkoxy group include methoxy, ethoxy, n-propoxy, isopropoxy, n-butoxy, isobutoxy and tertiary butoxy groups, and examples of the $C_{3-6}$ cycloalkyl group include cyclopropyl, cyclobutyl, cyclopentyl, cyclohexyl, methylcyclopropyl, dimethylcyclopropyl and the like. When the —$C_nH_{2n}$— group is alkylene group having 1 to 3 carbon atoms, it includes, for example, methylene, ethylene, 1-methylethylene, 2-methylethylene and trimethylene.

One of the types of the compounds falling under the scope of the Formula I are of the formula,

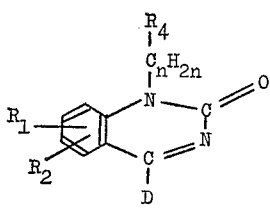

wherein D, $n$, $R_1$, $R_2$ and $R_4$ are the same as defined above.

Another type of the compounds falling under the scope of the Formula I are of the formula,

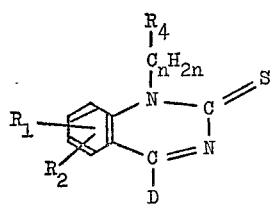

wherein D, $n$, $R_1$, $R_2$ and $R_4$ are the same as defined above.

Compounds of the Formula I and the pharmaceutically acceptable acid addition salts (e.g. hydrochloric acid-, hydrobromic acid-, sulfuric acid-, phosphoric acid-, nitric acid-, acetic acid-, maleic acid-, fumaric acid-, tartaric acid-, succinic acid- or citric acid-addition salt) of such compounds have excellent pharmacological properties, specially as anti-inflammatory and analgesic agents, and they are also useful as intermediates for preparing other medicines. Illustratively, 1-cyclopropylmethyl-4-phenyl-6-chloro-2(1H)-quinazolinone shows remarkable inhibitory action for carrageenin-induced edema in rat, and inhibits the edema by 44.8% at 15 mg./kg. (per os), 53.3% at 75 mg./kg. (per os) and 73.1% at 150 mg./kg. (per os), while no toxic symptoms are observed and occult bleeding is negative in feces after oral administration of 1,500 mg./kg. in rat. The anti-inflammatory activity of this compound is 6-times higher than that of 1,2-diphenyl-3,5-dioxo-4-n-butylpyrazolidine (phenylbutazone), and the acute, subacute and chronic toxicities are much lower than those of phenylbutazone.

Accordingly, an object of the present invention is to provide novel and useful quinazoline derivatives and salts thereof which have excellent pharmacological properties. Another object is to provide a process for producing such novel and useful quinazoline derivatives and salts thereof. A further object is to provide pharmaceutical composition containing such novel and useful quinazoline derivatives or salts thereof. Other objects and merits of the present invention will be apparent from the following descriptions.

In order to accomplish these objects the present invention provides novel quinazoline derivatives represented by the Formula I and acid addition salts thereof.

According to the present invention, the novel quinazoline derivatives represented by the Formula I may be prepared by a variety of methods.

One method for preparing quinazoline derivatives of the Formula I comprises reacting a compound of the formula,

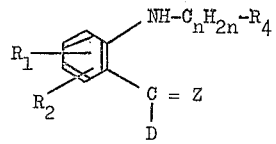

wherein $R_1$, $R_2$, $R_4$, D and $n$ are the same as defined above, and Z represents an oxygen atom or an imino group, with a compound having —NCO or —NCS group in the molecule such as cyanic acid or salt thereof, thiocyanic acid or salt thereof, carbamic acid ester, thiocyanic acid ester or carbamic acid halide. Examples of salts of cyanic acid include sodium cyanate, ammonium cyanate and potassium cyanate. Examples of salts of thiocyanic acid include sodium thiocyanate, potassium thiocyanate and ammonium thiocyanate. Examples of carbamic acid esters include alkyl carbamate such as ethyl carbamate and methyl carbamate. Examples of carbamic acid halide include carbamyl chloride. The reaction is carried out in the presence or absence of a solvent. Reaction temperature and solvent used vary depending upon the compound having —NCO or —NCS group.

The 2(1H) - quinazolinethione derivatives of the Formula I-b may be converted to the corresponding 2(1H)-quinazolinone derivative of the Formula I-a on treatment with an oxidizing agent in a solvent or solvent mixture. Examples of the oxidizing agents include hydrogen peroxide and permanganate. The choice of solvent depends on the oxidizing agent. The reaction temperature varies depending upon the oxidizing agent. On the other hand the 2(1H)-quinazolinone derivative of the Formula I-a may be converted to the 2(1H)-quinazolin-thione derivative of the Formula I-b by the reaction with phosphorous pentasulfide.

The compounds of the Formula IV are obtained by reacting indole derivatives of the formula,

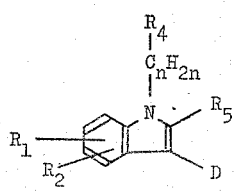

(VII)

wherein D, $R_1$, $R_2$, $R_4$ and $n$ are the same as defined above, and $R_5$ represents $C_{1-4}$ alkoxy-carbonyl, carboxy, carbamoyl or cyano; with an oxidizing agent, and then by hydrolyzing the resultant corresponding compounds of the formula,

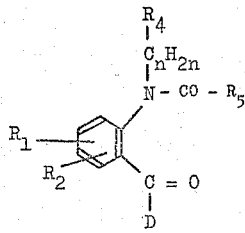

(VIII)

wherein D, $R_1$, $R_2$, $R_4$, $R_5$ and $n$ are the same as defined above; and further, if necessary, by treating the resultant compound of the formula,

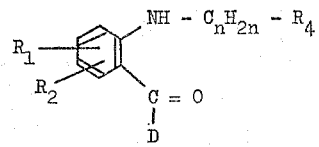

(IV–a)

wherein $R_1$, $R_2$, $R_4$, D and $n$ are the same as defined above, with ammonia to yield compounds of the formula,

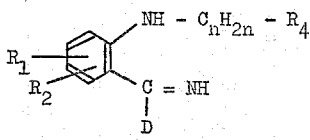

(IV–b)

wherein $R_1$, $R_2$, $R_4$ D and $n$ are the same as defined above.

Examples of the oxidizing agents used in the oxidation of the indole derivatives of the Formula VII include ozone, hydrogen peroxide, peracid (e.g., performic, peracetic and perbenozic acids), chromic acid, potassium permanganate and the like. A preferred oxidizing agent is chromic acid or ozone. The oxidation reaction is preferably effected in the presence of a solvent or solvent mixture. The choice of solvent depends on the oxidizing agent employed, and is selected from the group consisting of water, acetone, carbon tetrachloride, acetic acid, sulfuric acid and the like. The oxidizing agent is used in a stoichiometric amount or more. The reaction temperature varies depending on the oxidizing agent.

The hydrolysis of the compounds of the Formula VIII proceeds in the presence of a hydrolyzing agent. Examples of the hydrolyzing agents include mineral acid such as hydrogen chloride and sulfuric acid; alkali metal hydroxides such as sodium hydroxide, and potassium hydroxide, alkali earth metal hydroxides such as calcium hydroxide and barium hydroxide, alkali metal carbonates such as sodium carbonate and potassium carbonate, and ammonia compounds such as ammonium hydroxide. The hydrolysis reaction is carried out in a solvent or solvent mixture. Some examples of suitable solvents are water, methanol, ethanol, acetone, dimethylsulfoxide and the like and their mixture.

The compound of the Formula IV–b may also be obtained by treating benzonitrile derivatives of the formula,

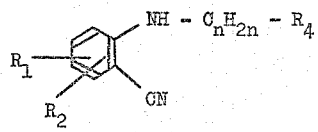

(IX)

wherein $R_1$, $R_2$, $R_4$ and $n$ are the same as defined above, with a compound represented by the formula,

D—M       (X)

wherein D is the same as defined above, and M represents Li, MgBr, MgCl or MgI, in the manner as described in Japanese patent publication No. 26,457/69.

Another method for preparing the quinazoline derivatives of the Formula I comprises treating the compound of the Formula IV–b with phosgene, and further, if necessary, by treating the resultant product of the Formula I–a with phosphorous pentasulfide.

The reaction of the compounds of the Formula IV–b with an equivalent quantity or excess of phosgene is carried out in the presence of an inert solvent such as ether, benzene, chloroform, toluene, dioxane and the like. The reaction is preferably carried out in the presence of an acid-binding agent. Examples of suitable acid-binding agents include tertiary organic bases such as triethylamine, tributylamine, pyridine or N-methylpiperidine; alkali metal hydroxides such as sodium hydroxide or potassium hydroxide; and alkali metal carbonates such as sodium carbonate or potassium carbonate.

A further method for preparing quinazoline derivatives of the Formula I is describe as follows. The, compound represented by the Formula IV–a is reacted with a trihalogenoacetic acid of the formula,

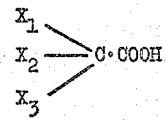

(V)

wherein $X_1$, $X_2$ and $X_3$ each represent halogen, or its reactive derivative, and then the resulting trihalogenoacetamide derivative of the formula,

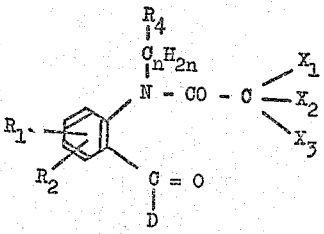

(VI)

wherein $R_1$, $R_2$, $R_4$, D, $n$, $X_1$, $X_2$ and $X_3$ are as defined above, is reacted with ammonia.

In the present invention, examples of the reactive derivative of the trihalogenoacetic acid include acid halides, and anhydride or esters. The reaction may be carried out in the presence or absence of an inert solvent with or without a condensing agent. The solvent used is selected according to the trihalogenoacetic acid or its reactive derivative employed. Thus, the solvent which is inert to the two starting materials can be preferably used. Available inert solvents are, for example, benzene, toluene, xylene, ether, tetrahydrofuran, methylene chloride, chloroform and the like. However, when the trihalogenoacetic acid derivative or the condensing agent employed is liquid, the reaction is carried out in the absence of the solvent. In the case of acid halides, it is desirable to carry out the reaction in the presence of a condensing agent, which includes an inorganic base such as sodium hydroxide, potassium hydroxide, sodium carbonate and potassium carbonate, or an organic base such as pyridine, triethyl amine and the like. Excess of the compound of the Formula IV–a is also used as a base. If a free trihalogenoacetic acid is used, suitable condensing agents are, in particular, dicyclohexylcarbodiimide, N-cyclohexyl-N′-morpholinoethylcarbodiimide or phosphorus trichloride.

The reaction of the thus obtained trihalogenoacetamido derivatives of the Formula VI with ammonia is carried out in the presence of a solvent. As the solvent employed for this process alcohols are desirable. Suitable alcohols include methanol, ethanol, isopropyl alcohol, tertiary-butylalcohol and the like. Dimethylsulfoxide may also be preferably used. Ammonia is used in the stoichiometric amount or more, and is added to the reaction mixture as gaseous, alcoholic or liquid ammonia or ammonia salt which is generating ammonia during the reaction (e.g. ammonium acetate or ammonium formate). Generally, the reaction proceeds at room temperature, but the temperature may be higher or lower, if necessary, to effect the desired control of the reaction.

A still further method for preparing quinazoline derivatives of the Formula I comprises reacting 1-unsubstituted quinazoline derivatives represented by the formula,

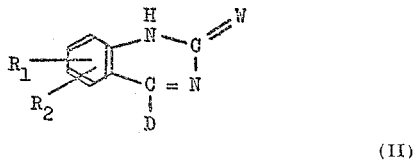

(II)

wherein $R_1$, $R_2$, D and W are the same as defined above, with a reactive ester of a compound represented by the formula, $$HO—C_nH_{2n}—R_4 \quad (III)$$

wherein $R_4$ and $n$ are the same as defined above. Examples of reactive esters include hydrohalic acid esters such as the chlorides, bromides and iodides and sulfonic acid esters such as methanesulfonate, p-toluenesulfonate, β-naphthalenesulfonate and trichloromethanesulfonate. The reaction may be carried out by reacting a compound of the Formula II with a reactive ester of the compound of the Formula III in the presence of an alkaline agent or by contacting the compound of the Formula II with an alkaline agent to form the metal salt and then contacting the resulting metal salt with a reactive ester of the compound of the Formula III. Examples of the alkaline agents include alkali metal hydride such as sodium hydride or lithium hydride, alkali metal hydroxide such as potassium hydroxide, alkali metal amide such as sodium amide, potassium amide or lithium amide, alkylalkali such as butyl lithium, phenylalkali such as phenyl lithium, alkali metal alcoholate such as sodium methylate, sodium ethylate, potassium tertiary-butoxide or the like. The reaction may generally be effected in an organic solvent or solvent mixture. Suitable solvents include benzene, toluene, xylene, dimethylformamide, dimethylacetamide, diphenyl ether, diglyme, dimethyl sulfoxide, methyl ethyl ketone, N-methyl pyrrolidone and the like, and a mixture thereof. The reaction may be carried out at a temperature within the range between about room temperature and the boiling point of the solvent employed.

The reaction is often accompanied by formation of the quinazoline derivatives of the formula,

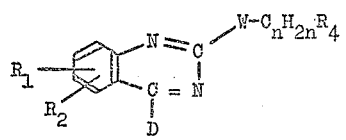

wherein D, $n$, $R_1$, $R_2$, $R_4$ and W are the same as defined above. The separation of the desired quinazoline derivatives of the Formula I from the quinazoline derivatives of the Formula II–a may be effected in a conventional manner, illustratively by chromatography. When the 1-unsubstituted quinazoline of the Formula II wherein W is a sulfur atom, is reacted with a reactive ester of a compound of the Formula III, the resultant product mainly produced is quinazoline derivatives of the Formula II–a.

According to the above processes, there are obtained, for example, the following quinazoline derivatives:

1-cyclopropylmethyl-4-phenyl-2(1H)-quinazolinone
1-cyclopropylmethyl-4-phenyl-5-chloro-2(1H)-quinazolinone
1-cyclopropylmethyl-4-phenyl-6-chloro-2(1H)-quinazolinone
1-cyclopropylmethyl-4-phenyl-7-chloro-2(1H)-quinazolinone
1-cyclopropylmethl-4-phenyl-6-bromo-2(1H)-quinazolinone
1-cyclopropylmethyl-4-phenyl-6-fluoro-2(1H)-quinazolinone
1-cyclopropylmethyl-4-phenyl-6-chloro-8-methyl-2(1H)-quinazolinone
1-cyclopropylmethyl-4-phenyl-6-methoxy-2(1H)-quinazolinone
1-cyclopropylmethyl-4-phenyl-6-methylthio-2(1H)-quinazolinone
1-cyclopropylmethyl-4-phenyl-6-methylsulfonyl-2(1H)-quinazolinone
1-cyclopropylmethyl-4-phenyl-6-trifluoromethyl-2(1H)-quinazolinone
1-cyclopropylmethyl-4-phenyl-6,8-dichloro-2(1H)-quinazolinone
1-cyclopropylmethyl-4-(o-fluorophenyl)-6-nitro-2(1H)-quinazolinone
1-cyclopropylmethyl-4-(o-chlorophenyl)-6-nitro-2(1H)-quinazolinone
1-cyclopropylmethyl-4-(m-chlorophenyl)-6-nitro-2(1H)-quinazolinone
1-cyclopropylmethyl-4-(p-chlorophenyl)-6-nitro-2(1H)-quinazolinone
1-cyclopropylmethyl-4-(o-tolyl)-6-nitro-2(1H)-quinazolinone
1-cyclopropylethyl-4-phenyl-6-nitro-2(1H)-quinazolinone
1-cyclopropylpropyl-4-phenyl-6-nitro-2(1H)-quinazolinone
1-cyclopropylmethyl-4-phenyl-6-nitro-2(1H)-quinazolinone
1-cyclopropylmethyl-4-phenyl-6-methylsulfinyl-2(1H)-quinazolinone
1-cyclopropylmethyl-4-phenyl-6,7-dichloro-2(1H)-quinazolinone
1-cyclopropylmethyl-4-phenyl-6-chloro-8-nitro-2(1H)-quinazolinone
1-cyclopropylmethyl-4-phenyl-6-chloro-8-methylthio-2(1H)-quinazolinone
1-cyclopropylmethyl-4-phenyl-6,7-dimethyl-2(1H)-quinazolinone
1-cyclopropylmethyl-4-phenyl-6,7-dimethyloxy-2(1H)-quinazolinone
1-cyclopropylmethyl-4-phenyl-6-chloro-2(1H)-quinazolinthione
1-cyclopropylmethyl-4-phenyl-6-chloro-2(1H)-quinazolinone
1-cyclopropylmethyl-4-(p-methoxyphenyl)-6-chloro-2(1H)-quinazolinone
1-cyclopropylmethyl-4-(o-chlorophenyl)-6-chloro-2(1H)-quinazolinone
1-cyclopropylmethyl-4-(p-chlorophenyl)-6-chloro-2(1H)-quinazolinone
1-cyclopropylmethyl-4-(m-chlorophenyl)-6-chloro-2(1H)-quinazolinone
1-cyclopropylmethyl-4-(m-chlorophenyl)-6-methoxy-2(1H)-quinazolinone
1-cyclopropylmethyl-4-(o-fluorophenyl)-6-chloro-2(1H)-quinazolinone
1-cyclopropylmethyl-4-(p-fluorophenyl)-6-chloro-2(1H)-quinazolinone 1-cyclopropylethyl-4-phenyl-6-chloro-2(1H)-quinazolinone
1-cyclopropylmethyl-4-(2'-pyridyl)-6-chloro-2(1H)-quinazolinone
1-cyclopropylmethyl-4-(2'-pyridyl)-6-bromo-2(1H)-quinazolinone
1-cyclopropylmethyl-4-(3'-pyridyl)-6-chloro-2(1H)-quinazolinone
1-cyclopropylmethyl-4-(4'-pyridyl)-6-chloro-2(1H)-quinazolinone
1-cyclobutylmethyl-4-phenyl-6-chloro-2(1H)-quinazolinone
1-cyclopentylmethyl-4-phenyl-6-chloro-2(1H)-quinazolinone
1-cyclohexylmethyl-4-phenyl-6-chloro-2(1H)-quinazolinone
1-cyclohexyl-4-phenyl-6-chloro-2(1H)-quinazolinone
1-cyclohexylethyl-4-phenyl-6-chloro-2(1H)-quinazolinone This invention is further disclosed in the following examples of more preferred embodiments thereof, which are presented for the purpose of illustration and it is not intended to limit the scope of the invention.

EXAMPLE 1

A solution of 50 g. of chromic anhydride in 50 ml. of water is added dropwise to a suspension of 60.2 g. of ethyl 1-cyclopropylmethyl-3-phenyl-5-chloroindole-2-carboxylate in 340 ml. of glacial acetic acid at 20°–25° C. The mixture is heated at 50°–55° C. for 6 hours. The reaction mixture is poured into water and extracted with toluene. The toluene extracts are combined, washed with water and dried over sodium sulfate, and the solvent is removed under reduced pressure to give 61.8 g. of crude 2-(N-cyclopropylmethyl-ethoxalylamino)-5-chlorobenzophenone as an oil. Crystallization from ethanol-petroleum ether gives colorless crystals having a melting point of 67°–68° C.

The thus obtained crude 2-(N-cyclopropylmethylethoxalyl-amino)-5-chlorobenzophenone is dissolved in 260 ml. of dimethyl sulfoxide. To the solution is added 57 g. of 40% potassium hydroxide aqueous solution, and the mixture is heated at 50°–55° C. for 2 hours. The reaction mixture is diluted with water and the deposited precipitates are collected by filtration, washed with water and dried to give 43.4 g. of crude 2-cyclopropylmethylamino-5-chlorobenzophenone having a melting point of 77°–78° C. Recrystallization from ethanol gives the pure product having the melting point of 86°–87° C.

EXAMPLE 2

A mixture of 25 ml. of concentrated hydrochloric acid and 25 ml. of water is added to a solution of 2.5 g. of 2-(N-cyclopropylmethyl-ethoxalyl-amino)-5-chlorobenzophenone in 62.5 ml. of ethanol. The mixture is heated under reflux for 6 hours. After cooling, the reaction mixture is concentrated under reduced pressure, diluted with 100 ml. of water and extracted with chloroform. The chloroform extracts are combined, washed successively, with water and with 20% potassium hydroxide solution, and dried over sodium sulfate. The chloroform is removed under reduced pressure to give 2-cyclopropylmethylamino-5-chlorobenzophenone quantitatively.

EXAMPLE 3

Using the procedure similar to that described in Example 1 but replacing ethyl 1-cyclopropylmethyl-3-phenyl-5-chloroindole-2-carboxylate by 1-cyclopropylmethyl-3-phenyl-5-chloro-indole-2-carboxylic acid, there is obtained 2-(N-cyclopropylmethyl-hydroxyoxalyl-amino)-5-chlorobenzophenone as an oil.

A mixture of 8 g. of 2-(N-cyclopropylmethyl-hydroxyoxalyl-amino)-5-chlorobenzophenone, 9.2 g. of sodium hydroxide and 100 ml. of water is refluxed for 2 hours. The reaction mixture is cooled and the precipitates are collected by filtration, washed with water and dried to give 2-cyclopropylmethyl-amino-5-chlorobenzophenone having a melting point of 82°–83° C. This product is identified with the compound obtained in Example 1 by means of infrared absorption spectrum.

EXAMPLE 4

A solution of 70 g. of chromic anhydride in 70 ml. of water is added dropwise to a suspension of 73.6 g. of 1-cyclopropylmethyl-2-cyano-3-phenyl-5-chloroindole in 500 ml. of glacial acetic acid at room temperature. The mixture is stirred at room temperature overnight. Then the reaction mixture is filtered, and the filtrate is poured into water and extracted with chloroform. The chloroform extracts are combined, washed with water and dried over sodium sulfate, and the solvent is removed under reduced pressure to give 55 g. of 2-(N-cyclopropylmethyl-cyanocarbonylamino)-5-chlorobenzophenone as an oil.

To a solution of 34 g. of 2-(N-cyclopropylmethyl-cyanocarbonylamino)-5-chloro-benzophenone in 100 ml. of ethanol is added a solution of 120 g. of sodium hydroxide in 300 ml. of water, and the mixture is heated under refluxing for 1 hour. The reaction mixture is extracted with chloroform. The chloroform extracts are combined, washed with water and dried over sodium sulfate, and the solvent is removed under reduced pressure. The residue is chromatographed on silica gel eluting with chloroform to give 2-cyclopropylmethylamino-5-chlorobenzophenone, M.P. 82°–83° C. This product is identified with the compound obtained in Example 1 by means of infrared absorption spectrum.

EXAMPLE 5

To a solution of 11.4 g. of crude 2-cyclopropylmethylamino-5-chlorobenzophenone in 100 ml. of glacial acetic acid is added 3.17 g. of potassium cyanate. The mixture is heated at 55°–60° C. with stirring overnight. The reaction mixture is poured into 500 ml. of ice-water. The precipitates are collected by filtration, washed with water and then with ether and dried to give 1-cyclopropylmethyl-4-phenyl-6-chloro-2(1H)-quinazolinone, M.P. 169°–170° C.

The following compounds are produced by the manner similar to that of Example 5.

1-cyclopropylmethyl-4-phenyl-6-bromo-2(1H)-quinazolinone, M.P. 163°–164° C.
1-cyclopropylmethyl-4-phenyl-6-fluoro-2(1H)-quinazolinone, M.P. 168.5°–169.5° C.
1-cyclopropylmethyl-4-phenyl-2(1H)-quinazolinone, M.P. 154°–155° C.
1-cyclopropylmethyl-4-phenyl-6-nitro-2(1H)-quinazolinone, M.P. 172°–173° C.
1-cyclopropylmethyl-4-phenyl-6-methoxy-2(1H)-quinazolinone, M.P. 115°–116° C.
1-cyclopropylmethyl-4-phenyl-6-methyl-2(1H)-quinazolinone, M.P. 162°–163° C.
1-cyclopropylmethyl-4-(o-fluorophenyl)-6-chloro-2(1H)-quinazolinone, M.P. 168°–169° C.
1-cyclopropylmethyl-4-(o-chlorophenyl)-6-chloro-2(1H)-quinazolinone, M.P. 202°–203° C.
1-cyclopropylmethyl-4-(p-methylphenyl)-2-(1H)-quinazolinone, M.P. 159°–160° C.
1-cyclopropylmethyl-4-phenyl-6,7-dichloro-2(1H)-quinazolinone, M.P. 206°–207° C.
1-cyclobutylmethyl-4-phenyl-6-chloro-2(1H)-quinazolinone, M.P. 115°–116° C.
1-cyclopentylmethyl-4-phenyl-6-chloro-2(1H)-quinazolinone, M.P. 222°–223° C.
1-cyclohexylmethyl-4-phenyl-6-chloro-2(1H)-quinazolinone, M.P. 224.5°–225.5° C.
1-cyclohexyl-4-phenyl-6-chloro-2(1H)-quinazolinone, M.P. about 120° C.
1-cyclopropylmethyl-4-(2'-pyridyl)-6-bromo-2(1H)-quinazolinone, M.P. 121°–123° C. (decomposition).

EXAMPLE 6

To a solution of 2.86 g. of 2-cyclopropylmethylamino-5-chlorobenzophenone in 20 ml. of glacial acetic acid is added 1.0 g. of sodium thiocyanate. The mixture is heated at 60° C. with stirring for 20 hours. After cooling, the reaction mixture is diluted with 50 ml. of chloroform and the mixture is washed three times with water. The organic layer is separated, dried over sodium sulfate and concentrated to dryness under reduced pressure. The oily residue is chromatographed on silica gel, eluted with chloroform to give 1 - cyclopropylmethyl - 4 - phenyl-6-chloro-2(1H)-quinazolinethione. Recrystallization from a mixture of ethanol and chloroform gives orange needles, M.P. 230°–231° C.

EXAMPLE 7

To a solution of 5.72 g. of 2-cyclopropylmethylamino-5-chlorobenzophenone in 40 ml. of glacial acetic acid is added 2.43 g. of potassium thiocyanate. The mixture is heated at 55° C. for 20 hours. Then, using the procedure similar to that described in Example 6, 1 - cyclopropylmethyl-4-phenyl-6-chloro-2(1H)-quinozolinethione is obtained as an orange crystal, M.P. 225°–227° C.

EXAMPLE 8

To a solution of 17.5 g. of ethyl 1-(β-cyclohexylethyl)-3-phenyl-5-chloroindole-2-carboxylate in 95 ml. of glacial acetic acid is added dropwise a solution of 11.5 g. of chromic anhydride in 11.5 ml. of water at 20°–25° C. The mixture is stirred at room temperature for 30 minutes and heated at 50°–55° C. for 5 hours. After cooling, the reaction mixture is poured into 500 ml. of water and extracted with chloroform. The extracts are combined, washed with water and dried over sodium sulfate, and the solvent is removed under reduced pressure to give 17.5 g. of 2-[N-(β-cyclohexylethyl)-ethoxalylamino]-5-chlorobenzophenone as an oil.

To a solution of 17.5 g. of the thus obtained 2-[N-(β-cyclohexylethyl) - ethoxalylamino] - 5 - chlorobenzophenone in 400 ml. of ethanol is added dropwise 150 ml. of concentrated hydrochloric acid, and the mixture is refluxed for 7 hours. Then the solvent is removed under reduced pressure. To the residue is added 300 ml. of cold water and the mixture is neutralized with concentrated ammonium hydroxide, and extracted with ether. The extracts are combined, washed with water and dried over sodium sulfate, and the solvent is removed under reduced pressure to give 10.7 g. of 2-(β-cyclohexylethylamino)-5-chlorobenzophenone as a brown oil.

EXAMPLE 9

To a solution of 6.84 g. of 2-(β-cyclohexylethylamino)-5-chlorobenzophenone in 40 ml. of glacial acetic acid is added 1.8 g. of potassium cyanate. The mixture is heated at 53°–55° C. with stirring for 17 hours. After cooling, the reaction mixture is poured into 200 ml. of water, then extracted with methylenedichloride. The organic layer is washed with water and dried over sodium sulfate, and the solvent is removed under reduced pressure. The residue is chromatographed on silica gel and is eluted with chloroform to give 3.46 g. of 1-(β-cyclohexylethyl)-4-phenyl-6-chloro-2(1H)-quinazolinone. Recrystallization from ethanol gives light yellow fine crystals, M.P. 115.5°–116.5° C.

EXAMPLE 10

A solution of 13.5 g. of chromic anhydride in 13.5 ml. of water is added to a solution of 17.4 g. of ethyl 1-cyclopropylmethyl - 3 - phenyl-5-trifluoromethylindole-2-carboxylate in 100 ml. of glacial acetic acid at 20°–25° C. The mixture is stirred at room temperature for 30 minutes, and heated at 50°–55° C. for 7 hours. After cooling, the reaction mixture is poured into 500 ml. of water and extracted with two 150 ml. portions of chloroform. The combined extracts are washed with water, dried over sodium sulfate, and concentrated in vacuo to dryness to give 16.4 g. of 2-(N-cyclopropylmethylethoxylamino)-5-trifluoromethylbenzophenone as an oil.

The thus obtained 2-(N-cyclopropylmethylethoxyalylamino)-5-trifluoromethylbenzophenone is dissolved in 200 ml. of 20% aqueous potassium hydroxide solution. The mixture is stirred and heated at 70°–80° C. for 4 hours, then cooled in an ice bath. The yellow precipitates are collected by filtration, washed with water, and dried to give 7.47 g. of 2-cyclopropylmethylamino-5-trifluoromethylbenzophenone, M.P. 102.0°–103.5° C.

EXAMPLE 11

A mixture of 2.15 g. of 2-cyclohexylamino-5-chlorobenzophenone, 3 g. of ethyl carbamate and 0.15 g. of zinc chloride is heated at 190°–200° C. (the oil both temperature) for 3 hours. After cooling, the reaction mixture is extracted with methylene chloride. The methylene chloride extracts are combined, washed with water, dried over sodium sulfate and concentrated to dryness under reduced pressure. The residue is chromatographed on silica gel and is eluted with benzene to give 1-cyclohexyl-4-phenyl-6-chloro-2(1H)-quinazolinone as a yellow solid, melting at about 120° C.

Infrared absorption spectrum ($\mu_{Nujol}$): 1600, 1590, 1580, 1540 cm.$^{-1}$.

According to the procedure similar to that mentioned above, 1 - cyclopropylmethyl-4-phenyl-6-trifluoromethyl-2(1H)-quinazolinone is obtained, M.P. 166.5°–167.5° C.

EXAMPLE 12

To a solution of 2.85 g. of 2-cyclopropylmethylamino-5-chlorobenzophenonimine and 12 ml. of triethylamine in 70 ml. of benzene is added dropwise under cooling 70 ml. of 10% phosgene solution in benzene. The mixture is stirred at room temperature for 30 minutes and then concentrated in vacuo to dryness.

To the residue are added 100 ml. of diluted aqueous sodium carbonate solution and 100 ml. of chloroform and the mixture is stirred. The aqueous layer is extracted with chloroform, and the organic layers are combined, washed with water and dried over sodium sulfate. The solvent is removed under reduced pressure and residue is recrystallized from ethanol to give 1-cyclopropylmethyl-4-phenyl - 6 - chloro-2(1H)-quinazolinone, M.P. 171°–172° C.

EXAMPLE 13

To a solution of 3.8 g. of 2-cyclopropylmethylamino-5-chlorobenzophenone in 40 ml. of dry ether is added 3.6 g. of trichloroacetylchloride. The mixture is heated under reflux for 3 hours. After cooling, the reaction mixture is washed with water and dried over sodium sulfate, and the solvent is removed under reduced pressure. The oily residue is chromatographed on silica gel, and is eluted with benzene to give 3 g. of 2-(N-cyclopropylmethyltrichloroacetamide-5-chlorobenzophenone as a pale yellow oil.

Infrared absorption spectrum, $\mu_{max.}$ 1680 cm.$^{-1}$ (C.=O).

The thus obtained 2-(N-cyclopropylmethyltrichloroacetamide-5-chlorobenzophenone (2.2 g.) is dissolved in 20 ml. of ethanol. To the solution is added 30 ml. of ethanolic ammonia. The mixture is allowed to stand at room temperature for 24 hours. The reaction mixture is concentrated to dryness under reduced pressure. The residue is triturated with ether to give 1-cyclopropylmethyl-4 - phenyl - 6-chloro-2-(1H)-quinazolinone. Recrystallization from ethanol gives pale yellow crystals having a melting point of 171°–172° C.

EXAMPLE 14

By the procedure similar to that described in Example 13, but replacing 2-cyclopropylmethylamino-5-chlorobenzophene by 2-cyclopropylmethylamino-5-trifluoromethylbenzophenone, there is obtained 1-cyclopropylmethyl-4- phenyl - 6 - trifluoromethyl-2(1H)-quinazolinone, M.P. 166.5°–167.5° C.

The following compounds are produced in the manner similar to that described in the Example 13 or 14.

1-cyclopropylmethyl-4-phenyl-2(1H)-quinazolinone, M.P. 154°–155° C.
1-cyclopropylmethyl-4-phenyl-6-bromo-2(1H)-quinazolinone, M.P. 163°–164° C.
1-cyclopropylmethyl-4-phenyl-6-fluoro-2(1H)-quinazolinone, M.P. 168.5°–169.5° C.
1-cyclopropylmethyl-4-phenyl-6-methyl-2(1H)-quinazolinone, M.P. 162°–163° C.
1-cyclopropylmethyl-4-phenyl-6-methoxy-2(1H)-quinazolinone, M.P. 115°–116° C.
1-cyclopropylmethyl-4-phenyl-6-nitro-2(1H)-quinazolinone, M.P. 172°–173° C.
1-cyclopropylmethyl-4-phenyl-6,7-dichloro-2(1H)-quinazolinone, M.P. 206°–207° C.
1-cyclopropylmethyl-4-phenyl-6,8-dichloro-2(1H)-quinazolinone
1-cyclopropylmethyl-4-(o-fluorophenyl)-6-chloro-2(1H)-quinazolinone, M.P. 168°–169° C.
1-cyclopropylmethyl-4-(o-chlorophenyl)-6-chloro-2(1H)-quinazolinone, M.P. 202°–203° C.
1-cyclopropylmethyl-4-(p-tolyl)-6-chloro-2(1H)-quinazolinone, M.P. 159°–160° C.
1-cyclopropylmethyl-4-(2'-pyridyl)-6-bromo-2(1H)-quinazolinone, M.P. 121°–123° C. (decomposition)
1-cyclobutylmethyl-4-phenyl-6-chloro-2(1H)-quinazolinone, M.P. 115°–116° C.
1-cyclopentylmethyl-4-phenyl-6-chloro-2(1H)-quinazolinone, M.P. 222°–223° C.
1-cyclohexylmethyl-4-phenyl-6-chloro-2(1H)-quinazolinone, M.P. 224.5°–225.5° C.
1-cyclohexylethyl-4-phenyl-6-chloro-2(1H)-quinazolinone, M.P. 115.5°–116.5° C.
1-cyclohexyl-4-phenyl-6-chloro-2(1H)-quinazolinone, M.P. about 120° C.

EXAMPLE 15

A solution of 5.13 g. of 4-phenyl-6-chloro-2(1H)-quinazolinone in 100 ml. of dimethylformamide is added dropwise to a suspension of 1 g. of 50% sodium hydride in 30 ml. of dimethyl formamide. The mixture is stirred at 100° C. for 30 minutes. The mixture is cooled to room temperature and 5.4 g. of cyclopropylmethyl bromide is added dropwise thereto. The mixture is heated at 100° C. for 5 hours, with stirring. After cooling, the reaction mixture is poured into 300 ml. of water and extracted with chloroform. The chloroform extracts are combined, washed with dilute aqueous sodium hydroxide solution and filtered. The filtrate is washed with diluted hydrochloric acid, followed by water and dried over sodium sulfate, and the solvent is removed under reduced pressure. The residue (7 g.) is chromatographed on silica gel, using chloroform as an eluent. From the first fraction, 1.48 g. of 2-cyclopropylmethoxy-4-phenyl-6-chloro-quinazoline is obtained as crystals having a melting point of 120°–121° C. From the second fraction 3.2 g. of 1-cyclopropylmethyl-4-phenyl-6-chloro-2(1H) - quinazolinone is obtained as crystals having melting point of 171°–172° C.

The 4-phenyl-6-chloro-2(1H)-quinazolinone used as the starting material in this example is obtained as follows:

To a stirred solution of 23.2 g. of 2-amino-5-chlorobenzophenone and 10.1 g. of triethylamine in 100 ml. of dry ether is added dropwise a solution of 18.2 g. of trichloroacetylchloride in 30 ml. of dry ether under ice-cooling. The mixture is stirred for 2 hours at room temperature, and washed with water. The ether layer is dried over sodium sulfate, and concentrated in vacuo to dryness. The oily residue is crystallized from 50 ml. of ethanol to give 32.4 g. of 2-trichloroacetamido-5-chlorobenzophenone as light yellow prisms, M.P. 93.0°–94.0° C.

To a solution of 32.1 g. of 2-trichloroacetamide-5-chlorobenzophenone in 600 ml. of dimethylsulfoxide are added 17.0 g. of triethylamine and 65.5 g. of ammonium acetate. The mixture is left at room temperature for 24 hours, and poured into 3 l. of water. The precipitate is collected by filtration, washed with water and dried to give 21.4 g. of 4 - phenyl-6-chloro-2(1H)-quinazolinone, M.P. over 300° C.

EXAMPLE 16

Using the procedure similar to that described in Example 15, but replacing 5.13 g. of 4-phenyl-6-chloro-2(1H)-quinazolinone in 100 ml. of dimethylformamide, 1 g. of 50% sodium hydride in 30 ml. of dimethylformamide and 5.4 g. of cyclopropylmethyl bromide by 10.7 g. of 4-phenyl-6-nitro-2(1H)-quinazolinone and 2.0 g. of 50% sodium hydride in 250 ml. of dimethylformamide and 12.0 g. of cyclopropylmethylbromide respectively, there are obtained 6.43 g. of 1 - cyclopropylmethyl-4-phenyl - 6 - nitro-2(1H)-quinazolinone and 1.72 g. of 2-cyclopropylmethoxy-4-phenyl-6-nitro quinazoline.

The former is recrystallized from ethanol to give light yellow needles having a melting point of 172°–173° C. The latter is also recrystallized from ethanol to give colorless needles having a melting point of 142.0°–144.0° C.

The 4-phenyl-6-nitro-2(1H)-quinazolinone used as the starting material in this example is prepared as follows:

To a mixture of 12.1 g. of 2-amino-5-nitrobenzophenone, 120 ml. of methylene chloride and 10 ml. of pyridine is added dropwise 10.9 g. of trichloroacetyl chloride at room temperature. After the mixture is stirred for 2 hrs., 50 ml. of water is added with stirring. The organic layer is treated by the procedure similar to that described in Example 15, and there is obtained 15.1 g. of 2-trichloroacetamido - 5 - nitrobenzophenone, M.P. 116°–117.5° C. Recrystallization from a mixture of ethanol and chloroform gives light brown crystals, M.P. 118.0°–119.0° C.

A solution of 3.9 g. of 2-trichloroacetamido-5-nitrobenzophenone in 100 ml. of tertiary-butyl alcohol is heated with 3.4 g. of 10% ethanolic ammonia at about 120° C. for 3 hours in a sealed tube. Then the mixture is concentrated in vacuo to dryness. The residue is washed with methylene chloride, and dried to give 4-phenyl-6-nitro-2(1H)-quinazolinone.

EXAMPLE 17

To a suspension of 4.52 g. of 4-phenyl-6-bromo-2(1H)-quinazolinone in 70 ml. of dimethylformamide is added 0.63 g. of 62.5% sodium hydride. The mixture is heated at 100° C. for 30 minutes. The mixture is cooled to room temperature and 4.5 g. of cyclopropylmethyl bromide is added thereto. The mixture is heated at 100° C. for 6 hours. After cooling, the reaction mixture is poured into 400 ml. of water, acidified with hydrochloric acid and extracted with chloroform. The chloroform extracts are washed successively with dilute hydrochloric acid, with dilute aqueous sodium hydroxide solution and with water, and dried over sodium sulfate. The solvent is removed under reduced pressure. The residue is treated by the procedure similar to that described in Example 15, and there are obtained 1.58 g. of 2-cyclopropylmethoxy-4-phenyl-6-bromo-2(1H)-quinazoline as crystals, which is recrystallized from ethanol to give colorless needles having a melting point of 133°–134° C., and obtained 2.63 g. of 1 - cyclopropyl-methyl - 4 - phenyl-6-bromo-2(1H)-quinazolinone as crystals, which is recrystallized from ethanol to give pale yellow fine needles having a melting point of 163°–164° C.

The 4-phenyl-6-bromo-2(1H)-quinazolinone used as a starting material in this example is obtained according to the procedure similar to that described in Examples 15 and 16. Recrystallization from ethanol-dimethylformamide gives crystals melting at 278°–280° C.

EXAMPLE 18

Using the procedure similar to that described in Example 17, 3.6 g. of 4-phenyl-6-fluoro-2(1H)-quinazolinone and 5.4 g. of cyclopropylmethyl bromide are reacted to give 1.68 g. of 1-cyclopropylmethyl-4-phenyl-6-fluoro-2(1H)-quinazolinone and 1.0 g. of 2-cyclopropylmethoxy-4-phenyl-6-fluoro-quinazoline. The former is recrystallized from ethanol to give pale yellow needles having a melting point of 168.5°–169.5° C. The latter is recrystallized from ethanol to give colorless crystals having a melting point of 92°–93° C.

The 4-phenyl-6-fluoro-2(1H)-quinazolinone used as the starting material in this example is obtained according to the procedure similar to that described in Examples 15 and 16.

EXAMPLE 19

Using the procedure similar to that described in Example 17, but replacing 4-phenyl-6-bromo-2(1H)-quinazolinone by 3.78 g. of 4-phenyl-6-methoxy-2(1H)-quinazolinone, there are obtained 2.50 g. of brown oily 1-cyclopropylmethyl-4-phenyl - 6 - methoxy - 2(1H) - quinazolinone and 1.64 g. of yellow oily 2-cyclopropylmethoxy - 4 - phenyl-6-methoxy-quinazoline. The former is crystallized from the mixture of isopropyl ether and ethanol to give yellow prisms having a melting point of 115.0°–116.0° C.

The latter is crystallized from isopropyl ether to give light yellow needles having a melting point of 121.0°–122.0° C.

The 4-phenyl-6-methoxy-2(1H)-quinazolinone is synthesized by the procedure similar to that described in Examples 15 and 16.

EXAMPLE 20

Using the procedure similar to that described in Example 17, but replacing 4.52 g. of 4-phenyl-6-bromo-2(1H)-quinazolinone in 70 ml. of dimethylformamide 0.63 g. of 62.5% sodium hydride and 4.5 g. of cyclopropylmethyl bromide by 5.49 g. of 4-(o-fluorophenyl)-6-chloro-2(1H)-quinazolinone in 100 ml. of dimethylformamide, 1 g. of 50% sodium hydride and 6 g. of cyclopropylmethyl bromide respectively, there are obtained 1.48 g. of 2 - cyclopropylmethoxy - 4 - (o - fluorophenyl)-6-chloro-quinazoline as crystals, which is recrystallized from ethanol-chloroform (5:2) to give colorless needles having a melting point of 168°–169° C. and 1.85 g. of 1-cyclopropylmethyl-4-(o-fluorophenyl) - 6 - chloro-2(1H)-quinazolinone, which is recrystallized from ethanol to give pale yellow needles having a melting point of 171°–172° C.

EXAMPLE 21

Using the procedure similar to that described in Example 20, but replacing 4-(o-fluorophenyl)-6-chloro-2(1H)-quinazolinone by 5.82 g. of 4-(o-chlorophenyl)-6-chloro-2(1H)-quinazolinone, there are obtained 3.51 g. of 1-cyclopropylmethyl-4-(o-chlorophenyl)-6-chloro - 2(1H) - quinazolinone and 2.01 g. of 2-cyclopropylmethoxy-4-(o-chlorophenyl)-6-chloroquinazoline. Each of them is recrystallized from ethanol to give colorless needles having melting point of 202.0°–203.0° C. for the former, and 171.0°–172.0° C. for the latter.

The 4-(o-chlorophenyl)-6-chloro-2(1H)-quinazolinone as the starting material is synthesized by the procedure similar to that described in Examples 15 and 16.

EXAMPLE 22

Using the procedure similar to that described in Example 20, but replacing 4 - (o-fluorophenyl) - 6 - chloro-2(1H)-quinazolinone by 4.73 g. of 4-(p-tolyl)-2(1H)-quinazolinone, there are obtained 2.73 g. of 1-cyclopropylmethyl - 4 - (p-tolyl)-2(1H)-quinazolinone and 1.0 g. of 2-cyclopropylmethoxy-4-(p-tolyl) quinazoline. The former is recrystallized from ethanol to give colorless needles having a melting point of 159°–160° C. The latter is also recrystallized from ethanol to give colorless prisms having a melting point of 80°–81° C.

4-(p-tolyl)-2(1H)-quinazolinone as the starting material is synthesized by the procedure similar to that described in Example 15 or 16.

EXAMPLE 23

Using the procedure similar to that described in Example 20, but replacing 4-(o-fluorophenyl)-6-chloro-2(1H) - quinazolinone, by 4.45 g. of 4-phenyl-2(1H)-quinazoline, there are obtained 2.30 g. of 1-cyclopropylmethyl - 4 - phenyl - 2(1H) - quinazolinone and 1.20 g. of 2 - cyclopropylmethoxy - 4 - phenylquinazoline. The former is recrystallized from ethanol to give light yellow plates having a melting point of 154.0°–155.0° C. The latter is recrystallized from ethanol to give light yellow prisms having a melting point of 98.0°–99.0° C.

The 4-phenyl-2(1H)-quinazolinone as the starting material is synthesized by the procedure similar to that described in Example 15 or 16.

EXAMPLE 24

To a suspension of 2.36 g. of 4-phenyl-6-methyl-2(1H)-quinazolinone in 50 ml. of dimethylformamide is added portionwise 0.42 g. of 62.5% sodium hydride. The mixture is heated at 100° C. for 30 minutes with stirring, and cooled to room temperature. Then, 3.0 g. of cyclopropylmethylbromide is added dropwise to the mixture. The resulting mixture is treated by the procedure similar to that described in Example 15 and there are obtained 0.82 g. of 2 - cyclopropylmethoxy - 4 - phenyl - 6 - methylquinazoline as crystals, which is recrystallized from ethanol to give colorless needles melting at 162°–167° C., and 1.46 g. of 1 - cyclopropylmethyl - 4 - phenyl - 6 - methyl-2(1H)-quinazolinone as crystals, which is recrystallized from ethanol to give colorless needles melting at 95°–96° C.

The 4 – phenyl - 6 - methyl - 2(1H) - quinazolinone as the starting material in this example is obtained according to the procedure similar to that described in Example 15 or 16. Recrystallization from dimethylformamide gives crystals, melting at 282°–283°C.

EXAMPLE 25

Using the procedure similar to that described in Example 15, but replacing 5.13 g. of 4-phenyl-6-chloro-2(1H)-quinazolinone in 100 ml. of dimethylformamide, 1 g. of 50% sodium hydride in 30 ml. of dimethylformamide and 5.4 g. of cyclopropylmethyl bromide by 5.82 g. of 4 - phenyl - 6,7 - dichloro - 2(1H) - quinazolinone in 100 ml. of dimethylformamide, 0.84 g. of 62.5% sodium hydride and 6.0 g. of cyclopropylmethyl bromide respectively, there are obtained 2.40 g. of 2-cyclopropylmethoxy - 4 - phenyl - 6,7-dichloroquinazoline as crystals, which is recrystallized from ethanol to give colorless needles melting at 102°–103° C. and 2.54 g. 1-cyclopropylmethyl - 4 - phenyl - 6,7 - dichloro - 2(1H) - quinazolinone as crystals, which is recrystallized from ethanol-chloroform to give pale yellow prisms melting at 206°–207° C.

EXAMPLE 26

Using the procedure similar to that described in Example 17, but replacing 4.52 g. of 4-phenyl-6-bromo-2(1H)-quinazolinone in 100 ml. of dimethylformamide, 0.84 g. of 62.5% sodium hydride and 4.5 g. of cyclopropylmethyl bromide by 5.13 g. of 4 - phenyl - 6 - chloro-2(1H)-quinazolinone in 100 ml. of dimethylformamide, 0.84 g. of 62.5% sodium hydride and 6.0 g. of cyclobutylmethyl bromide respectively, there are obtained 2.73 g. of 2 - cyclobutylmethoxy - 4 - phenyl - 6 - chloroquinazoline as a yellow oil and 1.87 g. of 1 - cyclobutylmethyl - 4 - phenyl - 6 - chloro-2(1H)-quinazolinone as crystals, which is recrystallized from ethanol gives pale yellow needles having a melting point of 115°–116° C.

EXAMPLE 27

By the procedure similar to that described in Example 26, 513 g. of 4 - phenyl - 6 - chloro - 2(1H) - quinazolinone is allowed to react with 7.1 g. of cyclohexylmethyl bromide to give the two isomers of 1 - cyclohexylmethyl - 4 - phenyl - 6 - chloro - 2(1H) - quinazolinone as colorless leaflets (from ethanol) melting at 224.5°–225.5° C. and 2 - cyclohexylmethoxy - 4-phenyl-6-chloroquinazoline as colorless crystals melting at 87°–88° C., respectively.

EXAMPLE 28

By the procedure similar to that described in Example 26, 5.13 g. of 4 - phenyl - 6 - chloro - 2(1H) - quinazolinone is allowed to react with 6.52 g. of cyclopentylmethyl bromide to give the two isomers of 1-cyclopentylmethyl - 4 - phenyl - 6 - chloro - 2(1H)-quinazolinone as pale yellow leaflets (from ethanol-chloroform) melting at 222°–223° C. and 2 - cyclopentylmethoxy-4-phenyl-6-chloro-quinazoline as yellow crystals melting at 82°–84° C., respectively.

EXAMPLE 29

According to the procedure similar to that described in Example 17, 1.21 g. of 4-(2'-pyridyl)-6-bromo-2(1H)-quinazolinone in 20 ml. of dimethylformamide, 0.17 g. of 62.5% sodium hydride, and 1.2 g. of cyclopropylmethyl bromide are allowed to react. The reaction mixture is poured into 100 ml. of water and extracted with ether. The ethereal extracts are washed with water, dried over sodium sulfate and concentrated to dryness. The residue (0.87 g.) is chromatographed on silica gel. Elution with chloroform gives 2 - cyclopropylmethoxy - 4 - (2'-pyridyl) - 6 - bromo - quinazoline, which is recrystallized from ethanol to give pale yellow needles melting at 108°–109° C.

Further elution of the column with ethyl acetate yields 1 - cyclopropylmethyl - 4 - (2' - pyridyl)-6-bromo-2(1H)-quinazolinone as an oil, which is crystallized from ethanol-petroleum benzene. Recrystallization from ethanol-benzene gives 1 - cyclopropylmethyl - 4 - (2' - pyridyl)-6-bromo-2(1H)-quinazolinone monoethanol as pale yellow prisms, M.P. 121°–123° C. (decomposition).

What is claimed is:

1. A quinazoline derivative represented by the formula,

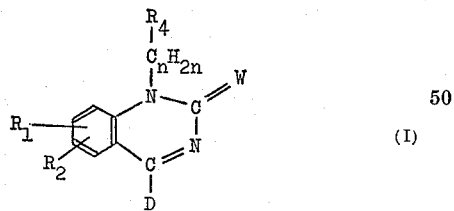

(I)

wherein D represents a group of the formula,

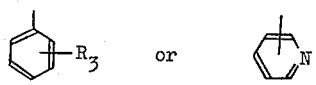

W represents oxygen or sulfur; $n$ represents 0 or an integer of 1 to 3; $R_1$, $R_2$ and $R_3$ each represents hydrogen, halogen, nitro, $C_{1-4}$ alkyl, $C_{1-4}$ alkoxy, $C_{1-4}$ alkylthio, trifluoromethyl; and $R_4$ represents $C_{3-6}$ cycloalkyl, and the pharmaceutically acceptable acid-addition salts thereof.

2. A quinazoline derivative and the pharmaceutically acceptable acid-addition salt thereof according to claim 1, wherein $n$ is 1 and $R_4$ is cyclopropyl.

3. A quinazoline derivative and the pharmaceutically acceptable acid-addition salt thereof according to claim 1, wherein D is phenyl, o-halogenophenyl or 2-pyridyl; $n$ is 1; $R_1$ is hydrogen, halogen, methyl, methoxy, nitro or trifluoromethyl, the said groups being bonded at the 6-position of the quinazoline ring; $R_2$ is hydrogen and $R_4$ is cyclopropyl.

4. A quinazoline derivative and the pharmaceutically acceptable acid-addition salt thereof according to claim 1, wherein D is phenyl; $n$ is 1; W is oxygen; $R_1$ is halogen or nitro, the said groups being bonded at the 6-position of the quinazoline ring; $R_2$ is hydrogen; and $R_4$ is cyclopropyl.

5. 1-cyclopropylmethyl - 4 - phenyl - 6 - chloro-2(1H)-quinazolinone and the pharmaceutically acceptable acid-addition salts thereof.

6. 1-cyclopropylmethyl - 4 - phenyl - 6 - nitro - 2(1H)-quinazolinone and the pharmaceutically acceptable acid-addition salts thereof.

7. 1-cyclopropylmethyl - 4 - phenyl - 2(1H)-quinazolinone and the pharmaceutically acceptable acid-addition salts thereof.

8. 1-cyclopropylmethyl - 4 - phenyl - 6 - fluoro-2(1H)-quinazolinone and the pharmaceutically acceptable acid-addition salts thereof.

9. 1-cyclopropylmethyl - 4 - phenyl - 6 - bromo-2(1H)-quinazolinone and the pharmaceutically acceptable acid-addition salts thereof.

10. 1-cyclopropylmethyl - 4 - phenyl-6-methyl - 2(1H)-quinazolinone and the pharmaceutically acceptable acid-addition salts thereof.

11. 1-cyclopropylmethyl - 4 - phenyl-6-methoxy-2(1H)-quinazolinone and the pharmaceutically acceptable acid-addition salts thereof.

12. 1-cyclopropylmethyl - 4 - phenyl-6-trifluoromethyl-2(1H)-quinazolinone and the pharmaceutically acceptable acid-addition salts thereof.

13. 1-cyclopropylmethyl - 4 - (o-fluorophenyl)-6-chloro-2(1H)-quinazolinone and the pharmaceutically acceptable acid-addition salts thereof.

14. 1-cyclopropylmethyl - 4 - phenyl-6-chloro - 2(1H)-quinazolinethione and the pharmaceutically acceptable acid-addition salts thereof.

15. 1-cyclopropylmethyl - 4 - (2'-pyridyl)-6-bromo - 2-(1H)-quinazolinone and the pharmaceutically acceptable acid-addition salts thereof.

16. A quinazoline derivative represented by the formula,

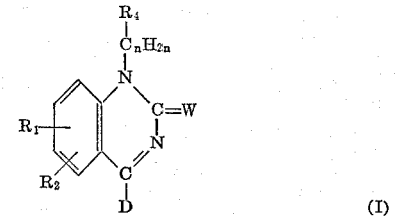

(I)

wherein D represents a group of the formula,

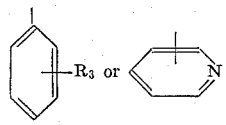

W represents oxygen or sulfur; $n$ represents 0 or an integer of 1 to 3; $R_1$, $R_2$ and $R_3$ each represents hydrogen, halogen, nitro, $C_{1-4}$ alkyl, $C_{1-4}$ alkoxy, $C_{1-4}$ alkylthio, $C_{1-4}$ alkylsulfonyl, $C_{1-4}$ alkylsulfinyl, trifluoromethyl; and $R_4$ represents $C_{3-6}$ cycloalkyl, and the pharmaceutically acceptable acid-addition salts thereof.

17. A quinazoline derivative and the pharmaceutically acceptable acid-addition salts thereof according to claim 16, wherein $n$ is 1 and $R_4$ is cyclopropyl.

18. A quinazoline derivative and the pharmaceutically acceptable acid-addition salts thereof according to claim 16, wherein D is phenyl, o-halogenophenyl or 2-pyridyl; $n$ is 1; $R_1$ is hydrogen, halogen, methyl, methoxy, nitro or trifluoromethyl, the said groups being bonded at the 6-position of the quinazoline ring; $R_2$ is hydrogen and $R_4$ is cyclopropyl.

19. The quinazoline derivative and the pharmaceutically acceptable acid-addition salts thereof according to claim 16, wherein D is phenyl; $n$ is 1; W is oxygen; $R_1$ is halogen or nitro, the said groups being bonded at the 6-position of the quinazoline ring; $R_2$ is hydrogen; and $R_4$ is cyclopropyl.

References Cited

FOREIGN PATENTS 1,520,743  3/1968  France.

NICHOLAS S. RIZZO, Primary Examiner

R. V. RUSH, Assistant Examiner

U.S. Cl. X.R.

260—256.4 Q, 256.5 R, 294.8 R, C, G, H, 295 R, CA, AM, 296 R, 319.1 553 A, 562 B, 566, 570 A; 424—251